Oct. 27, 1931.                D. O. TEASLEY                 1,829,024
REFRIGERATOR AND HYDRATOR FOR FRUITS AND VEGETABLES
Filed Nov. 7, 1930
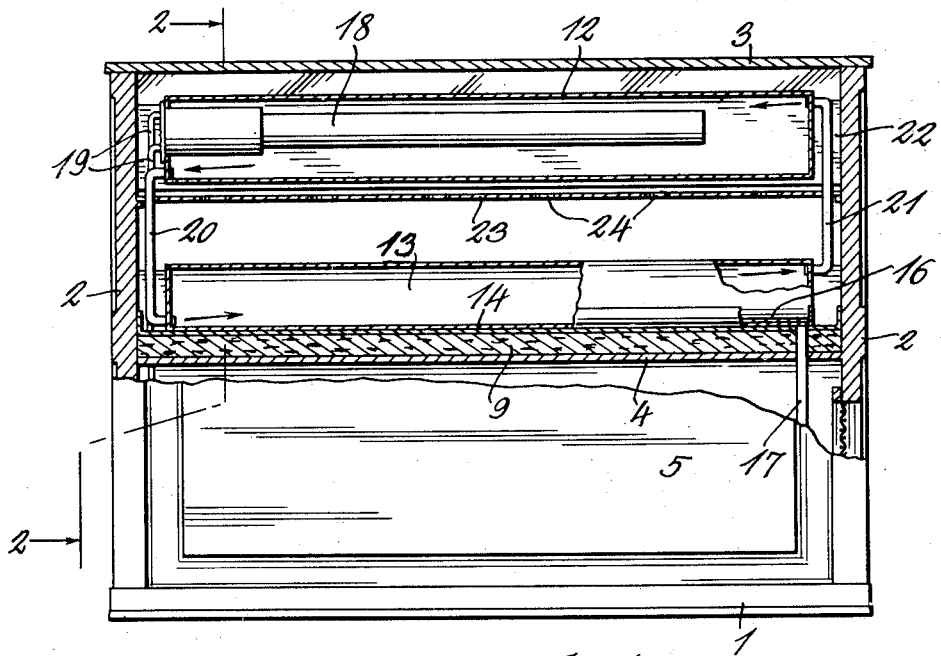
Fig. 1.
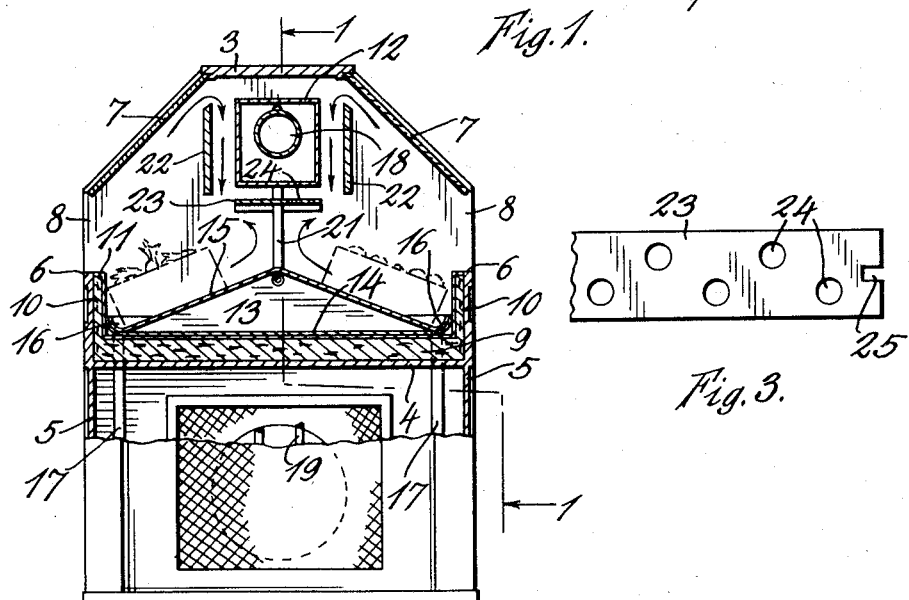
Fig. 2.
Fig. 3.
Inventor
Daniel O. Teasley.
By
Attorney Patented Oct. 27, 1931

1,829,024

UNITED STATES PATENT OFFICE

DANIEL O. TEASLEY, OF DENVER, COLORADO

REFRIGERATOR AND HYDRATOR FOR FRUITS AND VEGETABLES

Application filed November 7, 1930. Serial No. 494,066.

This invention relates to improvements in refrigerating devices and has reference more particularly to an improved refrigerator and hydrator for fruits and vegetables.

In stores where fruits and vegetables are sold, it is desirable and necessary to keep the same cool so as to prevent deterioration. It is, of course, essential that the temperature shall not fall below freezing, for otherwise the fruit and vegetables will become damaged and where vegetables, such as celery, lettuce, spinach and similar vegetables, are to be kept it is necessary that moisture shall be supplied to them in sufficient quantity to keep them from becoming wilted.

It is the object of this invention to produce a combined refrigerator and hydrator that shall be so designed that it will be convenient for use in stores and which shall be provided with means both for refrigerating and hydrating the articles contained therein.

Another object of this invention is to produce a combination of cooling tanks so constructed and assembled that they can readily be applied in place in my form of refrigerator and which shall also be provided with means for producing air currents in such a way that the moisture contained in the warmer air will be condensed by means which will cause the moisture in the air to fall upon the vegetables contained in the refrigerator.

The above and other objects that may become apparent as this description proceeds are attained by means of a construction and an arrangement of parts that will now be described in detail, and for this purpose reference will be had to the accompanying drawings, in which the preferred embodiment of the invention has been illustrated, and in which Fig. 1 is a longitudinal section through my improved refrigerator, taken on line 1—1 Fig. 2.

Fig. 2 is a section taken on line 2—2, Fig. 1, and

Fig. 3 is a detail showing a portion of the condenser plate.

In the drawings reference numeral 1 indicates the bottom or base of the refrigerator cabinet. Reference numerals 2 indicate the ends and 3 the top. The cabinet is divided into a lower and an upper compartment by means of a transverse partition 4. The sides of the cabinet are formed from wooden panels 5 that extend a short distance above the transverse partition and terminate at points 6. Extending downwardly from the edges of the top 3 are plate glass portions 7. These slant downwardly at an angle of about 45 degrees and the lower edges terminate a short distance above the upper ends of the sides, so as to provide openings 8, through which access may be had to the interior of the upper compartment. The above partition 4 and insulating layer 9 of cork or some similar heat insulating material is provided. A similar layer 10 of heat insulating material extends upwardly along the inner surface of the side members in the manner shown in Fig. 2. The inner surfaces of insulating members 10 and the upper surface of insulating member 9 are preferably covered with a layer of sheet metal 11. This layer serves as a protection for the heat insulating material and prevents water or moisture from coming in contact with it.

Located within the lower compartment is a refrigerating device comprising a motor, pump, condenser and other apparatus employed for this purpose. Located in the upper compartment and supported on the upper surface of the heat insulating material 9 is an assembly comprising an upper brine tank 12 and a lower brine tank 13. The upper brine tank is preferably of rectangular cross section as shown in Fig. 2 of the drawings, but may be round or of any other suitable cross section. The lower brine tank is preferably of a triangular cross section as shown in Fig. 2 in which the base has been designated by reference numeral 14 and the two upper sides by reference numeral 15. It is, of course, not essential to the operation of the device that tank 13 shall have its upper sides slanting, but this shape has been selected merely because it affords a convenient inclined support for the boxes in which the goods are displayed, tank 13 can therefore be of any suitable shape which provides the necessary difference in height between the openings to pipes 20 and 21. Sides 15 are inclined with respect to the base and have their outer edges secured to the latter. The outer edges of sides 15 are bent upwardly so as to form troughs 16, the ends of which are connected with downwardly extending drains 17. Instead of bending the sides 15 as shown and described, the troughs may be formed in any other suitable manner. Located within the upper brine tank is a cooling coil 18. This cooling coil is of the usual construction and has not been illustrated in detail, but merely indicated in a more or less diagrammatic manner. The cooling coil is connected with the refrigerating apparatus in the lower compartment by means of pipes 19, through which the refrigerating fluid flows. At one end of tanks 12 and 13 I provide a pipe 20 that connects the lower portions of the two tanks with each other in the manner shown in Fig. 1. The other ends of the tanks are connected by means of a pipe 21, whose ends communicate with the upper portions of the tanks. The two brine tanks are filled with brine and when a difference of temperature exists between the brine in the upper and the lower tanks a circulation of the brine will take place. If the brine in the upper tank is cooler than in the lower tank, the circulation will take place in the direction of the arrows shown in Fig. 1. It is apparent that the brine in the upper tank will always be cooler than in the lower tank for the reason that the cooling coil is located in the upper tank, while the fruit and vegetables are supported on sides 15 of the lower tank where they absorb heat. The temperature is so adjusted that the temperature of the brine in the lower tank never exceeds freezing or at least it must not be sufficiently low to cause the fruit and vegetables to freeze. The temperature in the upper tank will naturally be lower as above intimated. It is well known that cold air is heavier than warm air, and, therefore, the air that comes in contact with the upper brine tank will have a tendency to sink or move downwardly, and this will be replaced with warmer air from the space near the outer edges of the upper compartment. Located on opposite sides of tank 12 are deflector plates 22. These plates are spaced a short distance from the sides of the tank and the spaces between the plates and the tank serve as passages through which the air passes during the circulation. Located beneath the tank 12 is a condenser plate 23. This plate is supported at its ends and is provided with a plurality of openings 24. The ends of plate 23 are provided with notches 25 through which the pipes 20 and 22 extend. Plate 23 serves to condense moisture from the saturated air that comes in contact with it, and this moisture then falls downwardly onto the fruit and vegetables and any moisture that is not re-evaporated accumulates in troughs 16 from which it flows downwardly through drains 17.

By properly regulating the refrigerating apparatus the temperature within the upper compartment can be maintained at such value that the fruit and vegetables will keep without deterioration and at the same time be supplied with sufficient moisture to keep them in prime condition.

By constructing the case in the manner shown with openings 8 at opposite sides, access can be had to the compartment containing the fruit and vegetables from either side of the casing and without necessitating the opening and closing of doors, which saves a lot of time, and, therefore, makes this device especially well adapted for use in busy stores where many customers are to be served.

Since the refrigerating machinery that is employed is old and well known, no attempt has been made to show or describe it in detail. Special attention is called to the arrangement of brine tanks and the deflector plates and the condenser for the invention resides in this assembly itself and in the combination of this assembly with the specific construction of the upper compartment.

Having described the invention what is claimed as new is:

A combined refrigerator and hydrator comprising in combination a casing having a refrigerating chamber, two brine tanks in the chamber, said tanks being located one above the other and spaced apart, a cooling coil located in the upper tank, a pipe located at one end of the tank and connecting the lower portions of the tanks, and a second pipe located at the other end of the tanks and connecting the upper portions of the tanks whereby the brine will circulate through the two tanks in series when a difference in temperature exists between the brine in the tanks, the lower tank having a triangular cross section, one side forming the bottom and the other two forming the top, the lower edges of the top sections being bent so as to form drains.

In testimony whereof I affix my signature.

DANIEL O. TEASLEY.